United States Patent [19]
Colton

[11] Patent Number: 5,267,060
[45] Date of Patent: Nov. 30, 1993

[54] REFLECTIVE COLOR LIGHT FILTER AND METHOD OF MANUFACTURE

[75] Inventor: Russell F. Colton, Cedar Rapids, Iowa

[73] Assignee: Rockwell International Corporation, Seal Beach, Calif.

[21] Appl. No.: 887,112

[22] Filed: May 19, 1992

Related U.S. Application Data

[63] Continuation of Ser. No. 589,723, Sep. 28, 1990, abandoned.

[51] Int. Cl.$^5$ .......................... G02B 5/32; G03H 1/26
[52] U.S. Cl. ........................................ 359/15; 359/22; 359/25
[58] Field of Search ............... 350/3.7, 3.75, 3.76, 350/162.19, 162.2; 359/25, 15, 22, 589, 590, 24; 250/226

[56] References Cited

U.S. PATENT DOCUMENTS

| | | | |
|---|---|---|---|
| 3,442,566 | 5/1969 | Forward et al. | 350/3.75 |
| 3,567,305 | 3/1971 | Collier et al. | 359/25 |
| 3,728,014 | 4/1973 | Rosenblum | 350/162.2 |
| 4,017,158 | 4/1977 | Booth | 350/3.75 |
| 4,094,584 | 6/1978 | Hannan | 350/162.19 |
| 4,389,096 | 6/1983 | Hori et al. | 350/162.2 |
| 4,417,784 | 11/1983 | Knop et al. | 350/162.19 |
| 4,455,061 | 6/1984 | Case | 350/3.75 |
| 4,686,519 | 8/1987 | Yosida et al. | 340/701 |
| 4,717,221 | 1/1988 | McGrew | 350/3.7 |
| 4,798,448 | 1/1989 | van Raalte | 350/345 |
| 4,807,978 | 2/1989 | Grinberg et al. | 350/3.73 |
| 5,011,244 | 4/1991 | Smith et al. | 350/3.7 |
| 5,073,008 | 12/1991 | Terashita et al. | 359/589 |
| 5,140,464 | 8/1992 | Kyogoku et al. | 359/589 |
| 5,164,858 | 11/1992 | Aguilera, Jr. et al. | 359/590 |

FOREIGN PATENT DOCUMENTS 1-238680  9/1989  Japan ................... 350/3.76

*Primary Examiner*—Martin Lerner
*Attorney, Agent, or Firm*—Gregory G. Williams; M. Lee Murrah; H. Fredrick Hamann

[57] ABSTRACT

A color matrix display including a color matrix reflective filter (10) having groups of reflective red, green and blue (R, G, B) color elements (12) arranged in subgroups (20). The elements (12) of each color group (R, B, G) in each subgroup (20) are aligned with pixel subgroups of a matrix control element or LCD (18). The color elements (12) of the reflective filter transmit light (26) of their associated color to an aligned pixel associated with that color and reflect back (30) light of other colors to a reflective light assembly (16) for reuse. The color matrix reflective filter (10) is made by selectively exposing selected areas of a holographic optical element, or HOE, with a light of colors other than the color desired to be transmitted by that element (12) of that selected area.

1 Claim, 1 Drawing Sheet

5,267,060

REFLECTIVE COLOR LIGHT FILTER AND METHOD OF MANUFACTURE

This application is a File Wrapper Continuation of application Ser. No. 07/589,723 filed Sep. 28, 1990, now abandoned.

CROSS REFERENCE TO RELATED APPLICATION

This application relates to an application entitled "A Color Matrix Display Having An Enhanced Brightness Characteristic" filed by the same inventor on the same day and having Ser. No. 07/589,873, which application is incorporated herein by this reference.

TECHNICAL BACKGROUND

This ion generally relates to a color matrix reflective filter.

Various techniques are known for making three color, flat displays. In U.S. Pat. No. 4,807,978 issued Feb. 28, 1989 to Grinberg et al. color sensitive, holographic lens elements sensitive to different wavelengths of light are used to focus different wavelengths of light onto different corresponding target areas, while generally transmitting input light outside of their wavelengths of sensitivity. Disadvantageously, this approach results in significant loss of light intensity because of transmission attenuation and loss of unfocused light. In U.S. Pat. No. 4,686,519 issued Aug. 11, 1987 to Yoshida et al., lenticular and prism sheets are used to focus and diffract light into a spectrum that is refracted further to be coincident with corresponding light valves on a LCD. This system eliminates the standard absorption filters now commonly used, but again loses significant light intensity transmission. In U.S. Pat. No. 4,798,448 issued Jan. 17, 1989 to van Raalte, a lenticular screen and diffraction grating is used to split incident light into spectrum with red, green and blue components of light directed to corresponding pixels. A Brewster angle transparent plate system is used to provide monotonic polarization to light cells, but again significant amounts of light intensity are lost and the system is not well adapted for reflective displays.

Unfortunately, none of these systems are particularly well suited for back lit displays. Known back lit displays use absorbent light filter elements which transmit light only the color associated with the elements and absorb the remaining colors. This results in substantial inefficiency. This filter absorbs all elements of the light except the narrow band required for the particular pixel. In a full color matrix display, the filter is composed of sets of three color pixels. Each set consists of a blue, a green, and a red pixel. A full panel may consist of hundreds or thousands of these sets arranged in rows and columns. When a panel covered with these elements is illuminated with a white light, only the red wavelengths pass through the red cell, the blue and green wavelengths are absorbed. Likewise, for the green and blue cells. Accordingly, less than one-third of the illuminating light actually is used to provide a colored display.

SUMMARY OF THE INVENTION

It is therefore the primary object of the invention to provide a color matrix reflective filter and a method of making the color matrix reflective filter which overcomes the aforementioned problems by reflecting instead of absorbing colors of light not to be transmitted to a pixel.

Specifically, it is an object to provide a color matrix filter, comprising a substrate and a matrix of reflective color filter elements carried by the substrate for selectively transmitting light of different colors, said matrix being formed of plural groups of filter elements in which the filters of each group pass only one color and reflect the colors of the other groups.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DESCRIPTION OF THE PREFERRED EMBODIMENT

Figure 1:
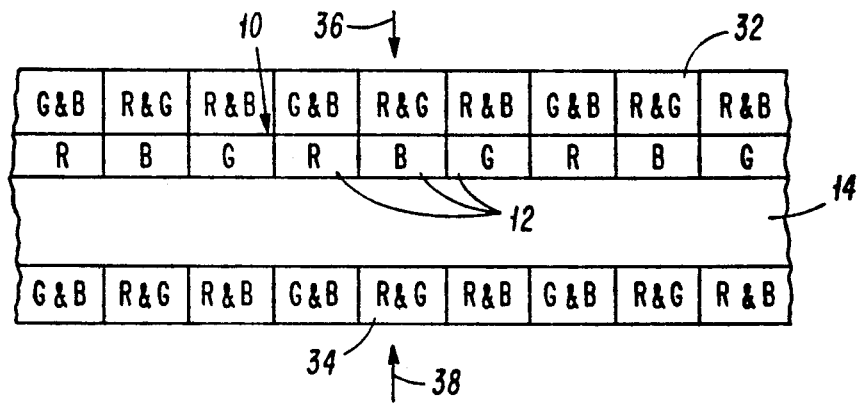
FIG. 1 is a schematic side view of the color matrix filter of the present invention together with a mask used to produce the color matrix.

Referring to FIG. 1, in accordance with the present invention, the problem with known matrix type colored displays is overcome by providing a matrix 10 of plural groups R, B and G of reflective color filter elements 12 carried by a substrate 14. The R, B and G groups of reflective color elements 12 respectively transmit red, blue and green light. Advantageously, instead of absorbing light of the colors of light not transmitted, each of the reflective filter elements 12 reflects the colors of light which it does not transmit. That is, the reflective color elements 12 in group R which transmit light having a wavelength in a selected red color range, reflect light having wavelengths outside of the selected red color range. The excluded portion particularly includes the selected blue and green portions of the spectrum which are selectively transmitted by the B and G groups, respectively, of filter elements 12. Likewise, the B and G groups reflect light which is outside of the selected blue and green portions of the spectrum which they transmit, respectively.

The color matrix filter is preferably made of a holographic optical device, or HOE, which has been treated in one of the ways described below with respect to FIGS. 1 and 2. In the method illustrated in FIG. 1, a pair of absorptive color matrix masks 32 and 34 placed on opposite sides of a HOE 10 with a plurality of absorptive filter elements arranged in groups and subgroups to match the pixel arrangement of the LCD or the other display control element. The matrix masks have absorptive elements which block, or absorb, the selected red, blue and green portion of the light spectrum to the red, blue and green filter elements 12 when a source of coherent white light is applied in the direction of arrows 36 and 38 to the absorptive matrix masks 32 and 34, respectively. The green and blue light is absorbed for the red filter elements 12; the red and green light is absorbed for the blue filter elements 12 and the red and blue light is absorbed to create a filter element 12 of group G.

Figure 2:
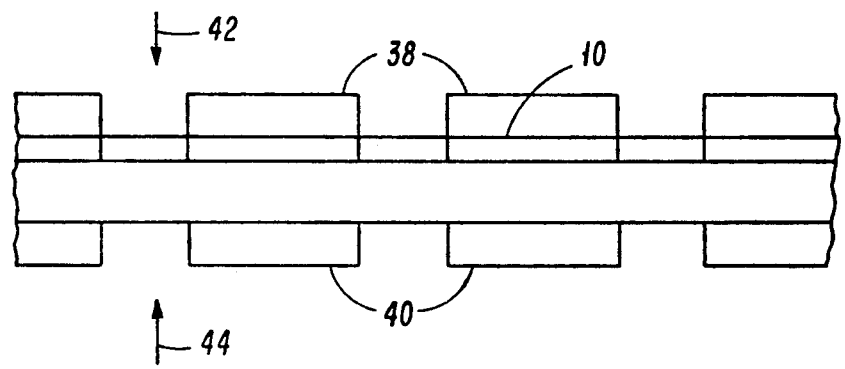
FIG. 2 is another schematic view similar to that of FIG. 1 to illustrate another method of making the color matrix filter.

Referring to FIG. 2, another method of providing the color filter matrix is to provide a pair of masks 38 and 40 on opposite sides of a HOE which block light to all except filter elements of one of the three groups R, B and G to be produced. Then the assembly of the HOE 10 and the masks 38 and 40 is exposed with light in the direction of arrows 42 and 44 of the multiple colors which are to be reflected by the filter element 12 of the group of elements 12 being prepared. For instance, if elements 12 of group B are to be produced, then the assembly is exposed to as number of green and red light spectrums spaced close enough to prevent significant transmission of any other color in the spectrum.

Based on an analysis of HOE performance certain conclusions have been reached. First, it appears that transmissive type HOEs cannot be used where the major light source arrives and departs nearly perpendicular to the HOE film. However, a reflective type HOE can be used in this application with suitable attention being given to design parameters of wavelength, bandwidth, depth of modulation and film thickness of the HOE. With the correct combination, a transmissive (nonreflective) window centered at a specified wavelength, but reflective at all other wavelengths in the visible spectrum, can be provided, as desired. For the specific case of a nonreflective window 40 nm wide centered at 400 nm with a theoretical efficiency of nearly 100%, the follow parameters would be used:
1. film thickness—20 micron
2. refractive index—1.35
3. refractive index modulation—0.1

The pixels for the blue desired pass filter are exposed with separate laser beam light sources, or other coherent light sources. For the 450 nm window, a series of six laser beams centered at: 400 nm, 500 nm, 550 nm, 600 nm, 650 nm, and 700 nm are used to get reflections centered on each of these points.

With both the reference beam and the object beam at ninety degrees to the film being exposed from opposite sides. The resulting angular bandwidth is very broad, being on the order of forty to sixty degrees.

For the green and red filter element 12, the same lasers are used. However, the one centered at the window wavelength for the color of that element is eliminated, and the ones omitted at the windows for elements of the other groups are added.

Figure 3:
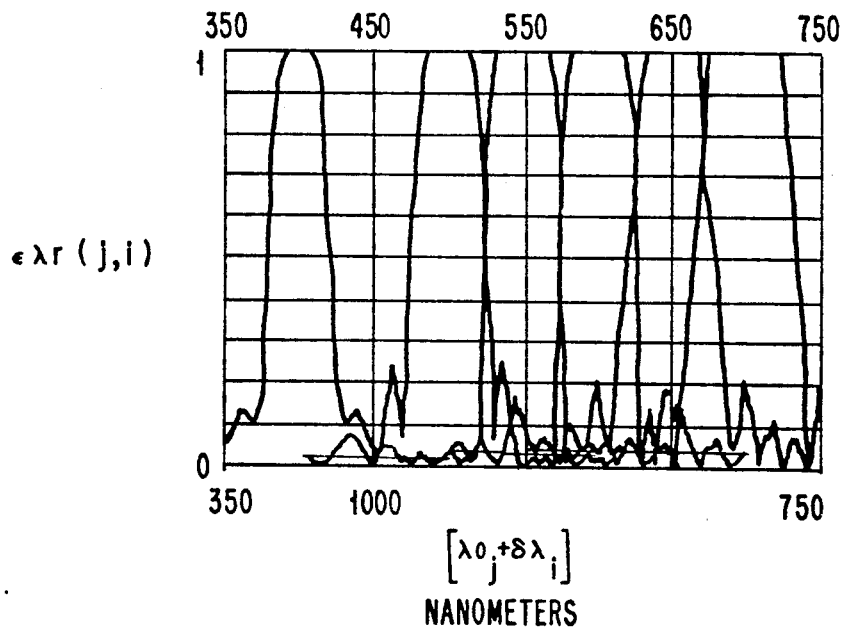
FIG. 3 is a plot of the filter response to blue light of an exemplary filter made in accordance with the method of this invention.

FIG. 3 illustrates the resulting band passes for a blue filter made as specified above.

It is understood that a color reflective filter of the present invention may be comprised of a plurality of filter elements arranged in a matrix array where several different color groups are represented in the array; however, it is also contemplated that the filter of the present invention may be a single filter element for a single color, as shown in FIG. 3, or with suitable omission of exposing light bandwidth it may be a single filter design for multiple colors, and it may be used in devices other than matrix LCDs.

While a detailed description of a preferred embodiment has been disclosed above, it should be appreciated that variations may be made with respect to both the apparatus and method of producing same without departing from the scope of the invention, as defined in the appended claims.

I claim:
1. A color filter comprising:
   a holographic optic element substrate;
   a planar plurality of first reflective color filter elements each having an illuminated side and an opposing viewer side, disposed on said substrate, for selectively transmitting light therethrough of a first predetermined bandwidth, from said illuminated side to said viewer side, so that, said first predetermined bandwidth can be perceived by a viewer;
   said plurality of first reflective color elements reflecting all light other than said first predetermined bandwidth in a direction away from said elements on said illuminated side;
   a planar plurality of second reflective color filter elements each having an illuminated side and an opposing viewer side, disposed on said substrate, for selectively transmitting light therethrough of a second predetermined bandwidth, from said illuminated side to said viewer side, so that, said second predetermined bandwidth can be perceived by a viewer;
   said plurality of second reflective color filter elements reflecting all light other than said second predetermined bandwidth in a direction away from said elements on said illuminated side; and,
   said second predetermined bandwidth being different from said first predetermined bandwidth, so that, said plurality of first reflective color filter elements do not pass any light therethrough having a wavelength which is equal to a wavelength of light that is passed through said plurality of second reflective color filter elements.

* * * * *